C. B. SCOTT.
BOTTLING MACHINE.
APPLICATION FILED JULY 2, 1915.

1,202,439.

Patented Oct. 24, 1916.
2 SHEETS—SHEET 1.

WITNESS
Edward A. Creed,

INVENTOR
Charles B. Scott,
BY
Allen & Daggett
ATTORNEYS.

C. B. SCOTT.
BOTTLING MACHINE.
APPLICATION FILED JULY 2, 1915.
1,202,439.
Patented Oct. 24, 1916.
2 SHEETS—SHEET 2.
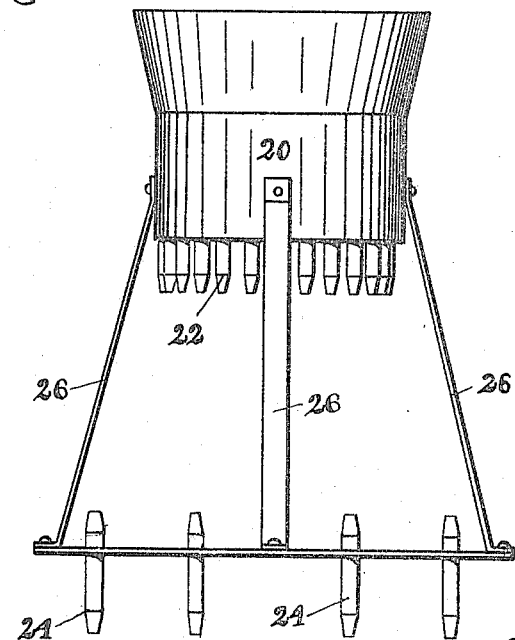
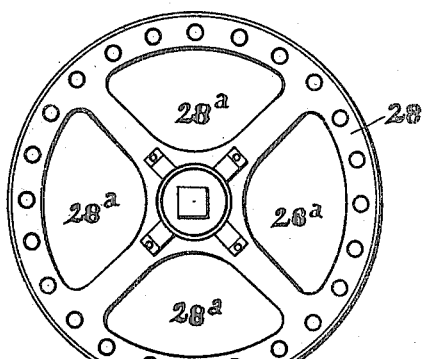
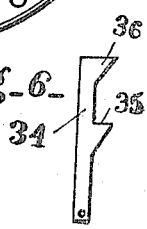
WITNESS
Edward A. Breed,
INVENTOR,
Charles B. Scott,
BY
Allen & Daggett
ATTORNEYS.

UNITED STATES PATENT OFFICE.

CHARLES B. SCOTT, OF HANOVER, NEW HAMPSHIRE.

BOTTLING-MACHINE.

1,202,439.   Specification of Letters Patent.   Patented Oct. 24, 1916.

Application filed July 2, 1915. Serial No. 37,754.

*To all whom it may concern:*

Be it known that I, CHARLES B. SCOTT, a citizen of the United States, residing at Hanover, in the county of Grafton, in the State of New Hampshire, have invented a certain new and useful Improvement in Bottling-Machines, of which the following is a specification, reference being had to the accompanying drawings.

The immediate object of this invention is to provide convenient means for rapidly filling a plurality of bottles and more particularly milk bottles; my improvement being clearly illustrated in the annexed drawings, in which—

Figure 1:
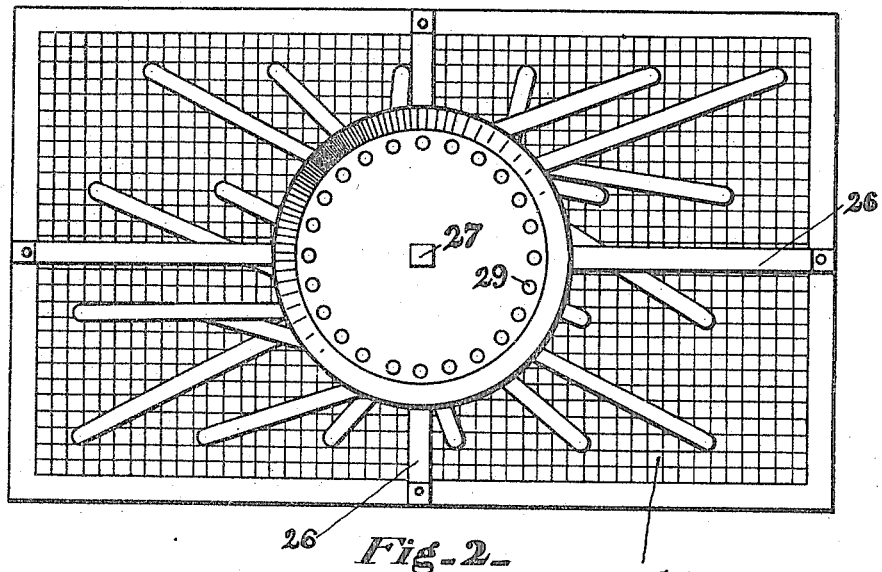
Figure 2:
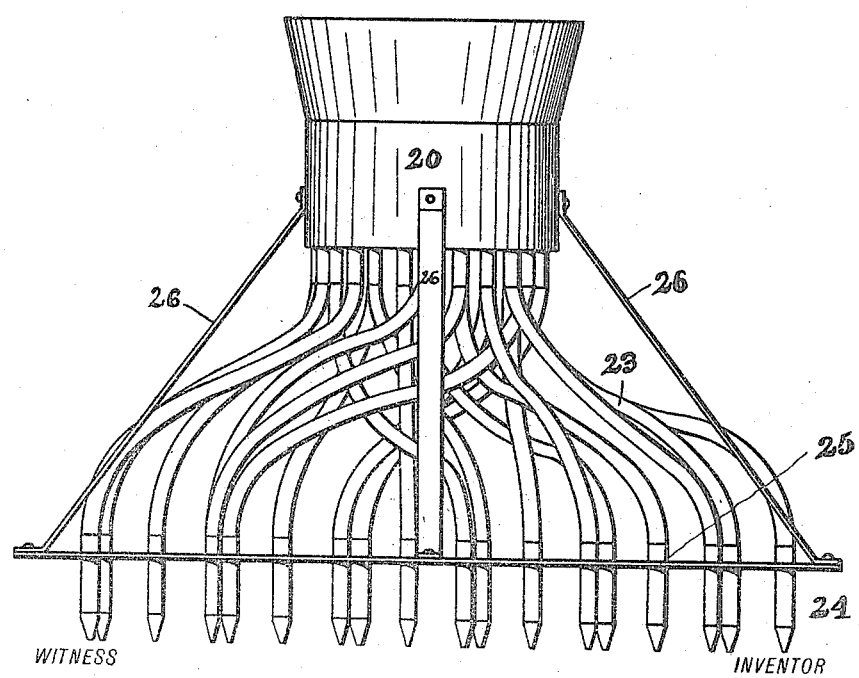

Figure 1 is a plan view and Fig. 2 is a side elevation of a machine embodying my said improvement; the valve disk being removed in said Fig. 1. Fig. 3 is an end view, similar to that of Fig. 2, but with the flexible pipes 23 removed. Fig. 4 is a relatively enlarged sectional view of the upper portion of the machine with the pan or milk receptacle broken away to disclose the valve mechanism contained in said receptacle, and in Fig. 5 I have shown a plan view of the said valve. Fig. 6 is a detached view of a latch by means of which the valve disk is held in its raised position.

Briefly described my improvement comprises a milk receptacle whose capacity is such that it will hold milk enough to fill several bottles, for example two or three dozen bottles. Fixed in the bottom of said receptacle are tubes equaling in number the number of bottles to be filled and said fixed tubes are connected, by means of flexible pipes, with other fixed tubes which are so spaced apart that the bottles may be arranged (one for each lower tube) without crowding said bottles. In the said milk receptacle is mounted, to slide vertically, a novel form of cut-off valve by means of which the outflowing milk may be instantly shut off from the plurality of bottles.

Referring now specifically to the drawings, the numeral 20 indicates a tank, of considerable size and capacity, having its lower portion formed with a vertical, circular, wall and its upper portion, by preference, flared as seen in the drawings. Fixedly secured in the bottom 21 of said receptacle are metallic tubes 22 which are connected, by means of flexible pipes 23, with similar tubes 24 that are fixedly secured to a rectangular frame or plate 25 and are so separated and arranged with respect to each other that a bottle may be placed under each of the said tubes 24 without interference with the other bottles. The frame 25 is suspended below the milk receptacle 20, as here shown, by means of bars 26 and so that the receptacle and frame 25 are held in fixed relation to each other.

Centrally located in the receptacle 20 is a, preferably square, post 27 upon which is mounted to slide vertically a valve disk 28 which carries a plurality of plugs 29, of rubber or cork, which equal in number the fixed tubes 22; the plugs 29 and tubes 22 being so arranged with respect to each other that, when the valve disk 28 is lowered, the said plugs will enter their respective tubes and act as closures for said tubes, thus stopping the milk from running out of the receptacle 20 until the valve disk is raised again. The said disk is formed with openings 28ª through which the milk passes downward when the disk is thus raised.

As here shown the valve disk has secured thereto a plurality of uprights 30 which support at their upper ends an enlarged collar 31 which serves as an operating handle by means of which the disk may be raised, and also as a support and guide to prevent the deflection of the valve disk as said disk slides up or down on the post 27. Coiled around the said post is a spring 32 one of whose ends abuts the hub of the disk, the other end of said spring abutting a pin 33 that is fixed in the post 27. The spring 32, in seeking to expand, moves the valve disk downward and forces the rubber plugs 29 into tight engagement with the tubes 22.

In Fig. 4 of the drawings the valve disk is shown in its elevated position, with the spring 32 under compression. In order to retain the valve disk in its elevated position, I provide a latch 34 which is located in a longitudinal slot in the post 27 and is provided with an angular abutment 35 which may engage the under side of the collar 31, as indicated in Fig. 4 of the drawings. The latch 34 is also formed at its upper end with an exposed thumb-piece 36 by means of which the latch may be pushed into the post 27 in order to disengage the abutment 35 from the said collar, so that the disk may drop to its closed position.

The operation of my described machine is as follows: Assuming that the machine is suitably elevated so that ordinary milk bottles may be placed thereunder, a bottle is located immediately under each tube 24, the valve disk 28 being in its lowered or closed position. The receptacle 20 is filled with milk and the said disk is raised by grasping the collar 31 and drawing the disk upward, against the resisting force of the spring 32 until it is engaged and latched in its raised position by the latch 34. As soon as all of the bottles are properly filled with milk the latch is released and the spring 32 instantly snaps the valve disk back to its closed position, thus cutting off the further delivery of milk from the receptacle 20 until the filled bottles have been removed and empty bottles substituted therefor.

In practice I prefer to locate the bottles on a bed that may then be elevated sufficiently to raise the bottle necks up to the level of the lower ends of the tubes 24 but such elevating device forms no part of my present improvement, therefore I have not considered it necessary to illustrate it.

Having thus described my invention, I claim as new and wish to secure by Letters Patent:—

1. In a bottling machine, the combination of a receptacle having a plurality of tubes and outlets in its bottom, a resiliently pressed valve-disk slidably mounted therein and equipped with a plurality of plugs adapted to enter and form closures for said tubes, a vertically disposed guiding member for said valve-disk and a latch hung in a slot in the guiding member of the valve-disk, said latch having lateral offsets, one at its upper end to provide for its finger or thumb actuation and the other offset to provide for the engagement thereof with a head or enlargement on said valve-disk.

2. In a bottling machine, the combination of a receptacle having a plurality of outlets in its bottom and tubes attached to the latter, a resiliently pressed valve-disk slidably mounted therein, and equipped with a plurality of plugs adapted to form closures for said tubes, a vertically disposed guiding member for said valve-disk, a latch hung in a slot in the guiding member of the valve-disk and adapted to engage a portion of said valve-disk, said valve-disk being equipped with a plurality of plugs adapted to operate as closures for said tubes, a further plurality of tubes and a plurality of flexible tubes effecting connection between the aforesaid sets of tubes.

CHARLES B. SCOTT.

Copies of this patent may be obtained for five cents each, by addressing the "Commissioner of Patents, Washington, D. C."